US006584138B1

(12) United States Patent
Neubauer et al.

(10) Patent No.: US 6,584,138 B1
(45) Date of Patent: Jun. 24, 2003

(54) CODING PROCESS FOR INSERTING AN INAUDIBLE DATA SIGNAL INTO AN AUDIO SIGNAL, DECODING PROCESS, CODER AND DECODER

(75) Inventors: Christian Neubauer, Nürnberg (DE); Ernst Eberlein, Grossenseebach (DE); Roland Plankenbühler, Nürnberg (DE); Albert Heuberger, Erlangen (DE); Heinz Gerhäuser, Waischenfeld (DE); Rainer Perthold, Erlangen (DE); Hartmut Schott, Erlangen (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/142,325

(22) PCT Filed: Jan. 24, 1997

(86) PCT No.: PCT/EP97/00338

§ 371 (c)(1),
(2), (4) Date: Oct. 5, 1998

(87) PCT Pub. No.: WO97/33391

PCT Pub. Date: Sep. 12, 1997

(30) Foreign Application Priority Data

| | | |
|---|---|---|
| Mar. 7, 1996 | (DE) | 196 08 926 |
| Oct. 2, 1996 | (DE) | 196 40 814 |
| Oct. 2, 1996 | (DE) | 196 40 825 |

(51) Int. Cl.[7] .......................... H04B 15/00; H04K 1/00; H04L 27/30

(52) U.S. Cl. ....................... 375/130; 380/252; 381/73.1

(58) Field of Search ................................ 375/130, 135, 375/136, 140, 141, 143, 146, 147, 285, 340, 346, 350, 351; 381/26, 73.1, 94.1; 380/253, 252; 704/203

(56) References Cited

U.S. PATENT DOCUMENTS

| | | | | |
|---|---|---|---|---|
| 3,885,217 | A | 5/1975 | Cintron | 325/26 |
| 4,980,917 | A * | 12/1990 | Hutchins | |
| 5,212,551 | A | 5/1993 | Conanan | 358/143 |

(List continued on next page.)

FOREIGN PATENT DOCUMENTS

| | | | | |
|---|---|---|---|---|
| GB | 2 260 246 A | 4/1993 | | H04H/1/00 |
| GB | 2 292 506 A | 2/1996 | | H04H/1/00 |
| WO | WO 94/11989 | 5/1994 | | H04N/5/76 |
| WO | WO 95/04430 | 2/1995 | | H04N/7/16 |
| WO | WO 97/09797 | 3/1997 | | H04B/15/00 |

OTHER PUBLICATIONS

Karlheinz Brandenburg and Thomas Sporer; "'NMR' and 'Masking Flag': Evaluation of Quality Using Perceptual Criteria"; presented at AES 11th International Conference (AES Test & Measurement Conference), Portland, Oregon, May 29–31, 1992; pp. 169–179, inclusive.

*Primary Examiner*—Jean Corrielus
(74) *Attorney, Agent, or Firm*—Glenn Patent Group; Michael A. Glenn

(57) ABSTRACT

In a coding method and a coder for introducing a non-audible data signal into an audio signal, the audio signal is first transformed to a spectral range and the masking threshold of the audio signal is determined. A pseudo-noise signal and a data signal are provided and multiplied with each other so a to provide a frequency-spread data signal. The spread data signal is weighted with the masking threshold, and thereafter the audio signal and the weighted data signal are superimposed. In a method and a decoder for decoding a data signal introduced into an audio signal in non-audible manner, the audio signal is first sampled and thereafter the sampled audio signal is filtered in non-recursive manner. The filtered audio signal is subsequently compared to a threshold value so as to retrieve the data signal.

28 Claims, 7 Drawing Sheets

U.S. PATENT DOCUMENTS

| | | | | | |
|---|---|---|---|---|---|
| 5,293,369 | A | * | 3/1994 | Melas et al. | |
| 5,319,735 | A | | 6/1994 | Preuss et al. | 395/2.14 |
| 5,384,856 | A | * | 1/1995 | Kyouno et al. | |
| 5,450,490 | A | | 9/1995 | Jensen et al. | 380/6 |
| 5,450,494 | A | * | 9/1995 | Okubo et al. | |
| 5,473,631 | A | | 12/1995 | Moses | 375/202 |

* cited by examiner

CODING PROCESS FOR INSERTING AN INAUDIBLE DATA SIGNAL INTO AN AUDIO SIGNAL, DECODING PROCESS, CODER AND DECODER

CROSS REFERENCE TO RELATED APPLICATIONS

This a 371 of PCT/EP97/00338 filed on Jan. 24, 1997.

BACKGROUND OF THE INVENTION

1. Field of the Invention

The present invention relates to a coding method and to a coder for introducing a non-audible data signal into an audio signal.

2. Description of the Related Art

The transmission of non-audible data signals in an audio signal is employed for example in range research for broadcasting. Range research serves to reliably determine the listener distribution of individual radio stations. The prior art knows various solutions for ascertaining the listener distribution of individual radio stations.

A first method operates such that a microphone, carried by a listener, is used for recording ambient noise which is compared by means of a reference receiver. On the basis of this comparison it is possible to determine the receiving frequency of the radio receiver.

A second method records the ambient noise in compressed form along with the information of the exact time in a memory and then transmits the same to a central station. In the latter, the data are compared by powerful computers with program examples recorded during a predetermined period of time, for example a day. The station listened to can be ascertained in this manner.

The methods described hereinbefore display the following deficiencies.

The system described first is not applicable to multi-band reception, multi-standard reception or multi-media reception, since it is restricted to the transmission of frequency-modulated signals only. Additional local broadcasting of other media via free FM channels is possible in individual cases only due to the multiplicity of program sources. Furthermore, with this method the same receiving strength as that of the receiver of the listener is necessary. In case of good receiving equipment or e. g. in cars, this requirement cannot be fulfilled. Another disadvantage consists in the reaction time for tuning the reference receiver and the correlation, since this increases with the numbers of programs offered and is in the range of minutes. The current consumption of such a method is considerable due to the components used, the receiver, signal processing etc. Moreover, the receiver cannot be designed in any economic manner desired, since the current consumption of the reference receiver directly determines the large-signal strength. Again another disadvantage consists in that the comparison principle is capable only of determining the frequency of the signal received, with the frequency occupancy, however, being dependent upon the momentary location. It is thus necessary to obtain information concerning the location of the listener, for example via the current transmitter tables.

The second method described hereinbefore involves the disadvantage of a considerable memory need since in case of recording over 24 hours, a net data quantity of about 150 MB results. Even in case of good compression e.g. by the factor of 10, a data amount of about 15 MB arises each day. The memories to be utilized are thus large and consequently expensive, and they also have a high current demand. In addition thereto, the determination of the reference programs causes difficulties since this needs to be performed in distributed manner all over the country. Still another problem consists in the problematic nature concerning data protection, as the audio information is collected directly from the environment of the test person and is conveyed further to a central evaluation.

For avoiding the problems outlined hereinbefore, the prior art has already suggested several methods in which an identification signal of a station is introduced in the form of a data signal into the audio signal to be transmitted. The data signal to be transmitted in this case is not audible for the listener.

Such methods are described for example in WO 94/11989, GB 2260246 A, GB 2292506 A and WO 95/04430. The disadvantage of these methods consists in that it cannot be ensured that the data signal is not audible to the listener at all times during transmission of the audio signal.

U.S. Pat. No. 5,450,490 describes an apparatus for and a method of embedding codes in audio signals and decoding the same. This system makes use of various symbols that are coded by means of interleaved frequency lines. To ensure that the data signals transmitted are not audible at any time, a masking assessment is carried out with respect to the individual frequencies of which the symbols to be transmitted are composed. The disadvantage of this method consists in that the generation of signals to be transmitted is very complex.

U.S. Pat. No. 5,473,631 refers to a communication system for transmitting at the same time data and audio signals via a conventional audio communication channel, making use of psycoacoustic coding techniques (perceptual coding). A first network is used which monitors the audio channel for detecting possibilities for introducing the data signal into the audio channel in such a manner that the signals introduced are masked by the audio signal. There is provided a control by means of which a data signal is provided which thereafter is stored in RAM memories. The data signal is coded either by a spread-spectrum coder. The data signal stored in the RAM memory is entered into a modulo2-coder in which it is mixed with a synchronous pseudo-noise code from a PN code generator. The resulting signal is introduced into a head signal generator, and the signal output from this generator is applied to an adjustable attenuation member. The output of the adjustable attenuation member is connected to a summer which serves to combine the audio signal and the data signal so as to issue the audio and data signal at the output thereafter. The network is used for establishing possibilities of introducing a data signal into the audio signal in such a manner that the data signals are not perceived by a human listener.

SUMMARY OF THE INVENTION

The object of the present invention resides in providing a method of coding a data signal contained in an audio signal in non-audible manner, in which it is ensured that the data signal to be transmitted is not perceptible to the human ear, and which is not susceptible with respect to interference phenomena and establishes good channel exploitation while permitting safe and simple decoding of the data signal.

According to a first aspect, the present invention is a coding method for introducing a non-audible data signal into an audio signal. The method has the following steps:

a) transforming the audio signal to the spectral range;

b) determining the spectrum of the masking threshold exclusively on the basis of the audio signal;

c) providing a pseudo-noise signal;

d) providing the data signal;

e) multiplying the pseudo-noise signal by the data signal so as to provide a frequency-spread data signal;

f) weighting the spectrum of the spread data signal with the spectrum of the masking threshold;

g) transforming the weighted data signal to the time domain; and h) superimposing the audio signal and the weighted signal.

According to a second aspect, the present invention is a coding method for introducing a non-audible data signal into an audio signal, the method having the following steps:

a) transforming the audio signal to the spectral range;

b) determining the spectrum of the masking threshold exclusively on the basis of the audio signal;

c) providing a pseudo-noise signal;

d) providing the data signal;

e) multiplying the pseudo-noise signal by the data signal so as to provide a frequency-spread data signal;

f) weighting the spectrum of the spread data signal with the masking threshold;

g) superimposing the audio signal and the weighted signal in the spectral range; and h) transforming the weighted data signal to the time domain.

Another object of the present invention resides in providing a coder for introducing and extracting a data signal contained in an audio signal in non-audible manner, in which it is ensured that the data signal to be transmitted is not perceived by the human ear, and which is not susceptible with respect to interference phenomena and establishes good channel exploitation while permitting safe and simple decoding of the data signal.

The present invention provides a coder for introducing a non-audible data signal into an audio signal, having a means for transforming the audio signal to the spectral range;

a means for determining the spectrum of the masking threshold exclusively on the basis of the audio signal;

a pseudo-noise signal source;

a data signal source;

a means for multiplying the pseudo-noise signal by the data signal so as to provide a frequency-spread data signal;

a means for weighting the spectrum of the spread data signal with the spectrum of the masking threshold;

a means for transforming the weighted signal to the time domain; and a means for superimposing the audio signal and the weighted data signal.

The present invention further provides a coder for introducing a non-audible data signal into an audio signal, having a means for transforming the audio signal to the spectral range;

a means for determining the spectrum of the masking threshold exclusively on the basis of the audio signal;

a pseudo-noise signal source;

a data signal source;

a means for multiplying the pseudo-noise signal by the data signal so as to provide a frequency-spread data signal;

a means for weighting the spectrum of the spread data signal with the masking threshold;

a means for superimposing the audio signal and the weighted data signal in the spectral range; and a means for transforming the weighted signal to the time domain.

An advantage of the method according to the invention consists in that information is introduced into an audio signal without being perceived by the human ear, while however being safely decoded by a detector. A further advantage of the present invention resides in that spread-spectrum-modulation is employed in which the information or data signal is spread to the entire transmission band, thereby reducing the susceptibility to interference phenomena and multipath propagation. At the same time, good channel exploitation is achieved.

In accordance with the present invention, non-audibility is obtained in that the audio signal, being for example a music signal, to which the data signal or information is to be added, is subjected to psychoacoustics calculation. On the basis thereof, the masking threshold is ascertained, and the spread-spectrum signal is weighted therewith. This ensures that there is at no time more energy used for data transmission than is admissible psychoacoustically.

The method of decoding the coded data signal makes use of a non-recursive filter (matched filter). The advantage hereof is that this filter can be employed for correlation and reconstruction so that the method of decoding is particularly simple, which is advantageous with respect to a subsequent hardware realization. A decoder can be provided, for example, in the form of a wrist watch that is easy to wear for test persons.

An advantage of the coder according to the invention is that information is introduced into an audio signal without being perceived by the human ear, while however being safely decoded by a detector. A further advantage of the present invention consists in that spread-spectrum modulation is employed in which the information or data signal is spread to the entire transmission band thereby reducing the susceptibility to interference phenomena and multipath propagation. At the same time, good channel exploitation is achieved.

In accordance with the present invention, the non-audibility is obtained in that the audio signal, being for example a music signal, to which the data signal or information is to be added, is subjected to psychoacoustics calculation. On the basis thereof, the masking threshold is ascertained, and the spread-spectrum signal is weighted therewith. This ensures that there is at no time more energy used for data transmission than is admissible psychoacoustically.

The decoder makes use of a non-recursive filter (matched filter). The advantage hereof resides in that this filter can be employed for correlation and reconstruction so that the method of decoding is particularly simple, which is advantageous with respect to a subsequent hardware realization.

According to a another aspect, the present invention provides an apparatus for determining the listener distribution of individual radio stations by way of an identification signal, the apparatus having a coder which introduces the identification signal into the audio signal and has the following features:

a means for transforming the audio signal to the spectral range;

a means for determining the spectrum of the masking threshold exclusively on the basis of the audio signal;

a pseudo-noise signal source;

a data signal source;

a means for multiplying the pseudo-noise signal by the data signal so as to provide a frequency-spread data signal;

a means for weighting the spectrum of the spread data signal with the spectrum of the masking threshold;

a means for transforming the weighted data signal to the time domain; and a means for superimposing the audio signal and the weighted data signal;

and comprising a decoder which extracts the identification signal from the audio signal transmitted.

According to a another aspect, the present invention provides an apparatus for determining the listener distribution of individual radio stations by way of an identification signal, the apparatus having a coder which introduces the identification signal into the audio signal and has the following features:

a means for transforming the audio signal to the spectral range;

a means for determining the spectrum of the masking threshold exclusively on the basis of the audio signal;

a pseudo-noise signal source;

a data signal source;

a means for multiplying the pseudo-noise signal by the data signal so as to provide a frequency-spread data signal;

a means for weighting the spectrum of the spread data signal with the masking threshold;

a means for superimposing the audio signal and the weighted data signal in the spectral range; and a means for transforming the superimposed signal to the time domain;

and comprising a decoder which extracts the identification signal from the audio signal transmitted.

According to a another aspect, the present invention provides an apparatus for determining the transmitter reach of a radio station by way of an identification signal, the apparatus having a coder which introduces the identification signal into the audio signal and has the following features:

a means for transforming the audio signal to the spectral range;

a means for determining the spectrum of the masking threshold exclusively on the basis of the audio signal;

a pseudo-noise signal source;

a data signal source;

a means for multiplying the pseudo-noise signal by the data signal so as to provide a frequency-spread data signal;

a means for weighting the spectrum of the spread data signal with the spectrum of the masking threshold;

a means for transforming the weighted signal to the time domain; and a means for superimposing the audio signal and the weighted data signal in the spectral range;

and comprising a decoder which extracts the identification signal from the audio signal transmitted.

According to a another aspect, the present invention provides an apparatus for determining the transmitter reach of a radio station by way of an identification signal, the apparatus having a coder which introduces the identification signal into the audio signal and has the following features:

a means for transforming the audio signal to the spectral range;

a means for determining the spectrum of the masking threshold exclusively on the basis of the audio signal;

a pseudo-noise signal source;

a data signal source;

a means for multiplying the pseudo-noise signal by the data signal so as to provide a frequency-spread data signal;

a means for weighting the spectrum of the spread data signal with the masking threshold;

a means for superimposing the audio signal and the weighted data signal in the spectral range; and a means for transforming the weighted signal to the time domain;

and comprising a decoder which extracts the identification signal from the audio signal transmitted.

According to a another aspect, the present invention provides an apparatus for identifying audio signals with an unequivocal identification number for identifying the sources of copies of sound carriers, the apparatus having a coder which introduces the identification signal into the audio signal and has the following features:

a means for transforming the audio signal to the spectral range;

a means for determining the spectrum of the masking threshold exclusively on the basis of the audio signal;

a pseudo-noise signal source;

a data signal source;

a means for multiplying the pseudo-noise signal by the data signal so as to provide a frequency-spread data signal;

a means for weighting the spectrum of the spread data signal with the spectrum of the masking threshold;

a means for transforming the weighted signal to the time domain; and a means for superimposing the audio signal and the weighted data signal;

and comprising a decoder which extracts the identification signal from the audio signal transmitted.

According to a another aspect, the present invention provides an apparatus for identifying audio signals with an unequivocal identification number for identifying the sources of copies of sound carriers, the apparatus having a coder which introduces the identification signal into the audio signal and has the following features:

a means for transforming the audio signal to the spectral range;

a means for determining the spectrum of the masking threshold exclusively on the basis of the audio signal;

a pseudo-noise signal source;

a data signal source;

a means for multiplying the pseudo-noise signal by the data signal so as to provide a frequency-spread data signal;

a means for weighting the spectrum of the spread data signal with the masking threshold;

a means for superimposing the audio signal and the weighted data signal in the spectral range; and a means for transforming the weighted signal to the time domain;

and comprising a decoder which extracts the identification signal from the audio signal transmitted.

According to a another aspect, the present invention provides an apparatus for the remote control of audio apparatus by way of a control signal, the apparatus having a coder which introduces the control signal into the audio signal and has the following features:

a means for transforming the audio signal to the spectral range;

a means for determining the spectrum of the masking threshold exclusively on the basis of the audio signal;

a pseudo-noise signal source;

a data signal source;

a means for multiplying the pseudo-noise signal by the data signal so as to provide a frequency-spread data signal;

a means for weighting the spectrum of the spread data signal with the spectrum of the masking threshold;

a means for transforming the weighted signal to the time domain; and a means for superimposing the audio signal and the weighted data signal;

and comprising a decoder which extracts the identification signal from the audio signal transmitted.

According to a another aspect, the present invention provides an apparatus for the remote control of audio apparatus by means of a control signal, the apparatus having a coder which introduces the control signal into the audio signal and has the following features:

a means for transforming the audio signal to the spectral range;

a means for determining the spectrum of the masking threshold exclusively on the basis of the audio signal;

a pseudo-noise signal source;

a data signal source;

a means for multiplying the pseudo-noise signal by the data signal so as to provide a frequency-spread data signal;

a means for weighting the spectrum of the spread data signal with the masking threshold;

a means for superimposing the audio signal and the weighted data signal in the spectral range; and a means for transforming the weighted signal to the time domain;

and comprising a decoder which extracts the identification signal from the audio signal transmitted.

According to a another aspect, the present invention provides an apparatus for providing a data channel of low bit rate in digitally operating audio apparatus, the data channel operating in parallel to the audio signal, the apparatus having a coder which introduces the information into the audio signal and has the following features:

a means for transforming the audio signal to the spectral range;

a means for determining the spectrum of the masking threshold exclusively on the basis of the audio signal;

a pseudo-noise signal source;

a data signal source;

a means for multiplying the pseudo-noise signal by the data signal so as to provide a frequency-spread data signal;

a means for weighting the spectrum of the spread data signal with the spectrum of the masking threshold;

a means for transforming the weighted signal to the time domain; and a means for superimposing the audio signal and the weighted data signal;

and comprising a decoder which extracts the identification signal from the audio signal transmitted.

According to a another aspect, the present invention provides an apparatus for providing a data channel of low bit rate in digitally processing audio apparatus, the data channel operating in parallel to the audio signal, the apparatus having a coder which introduces the information into the audio signal and has the following features:

a means for transforming the audio signal to the spectral range;

a means for determining the spectrum of the masking threshold exclusively on the basis of the audio signal;

a pseudo-noise signal source;

a data signal source;

a means for multiplying the pseudo-noise signal by the data signal so as to provide a frequency-spread data signal;

a means for weighting the spectrum of the spread data signal with the masking threshold;

a means for superimposing the audio signal and the weighted data signal in the spectral range; and a means for transforming the weighted signal to the time domain;

and comprising a decoder which extracts the identification signal from the audio signal transmitted.

BRIEF DESCRIPTION OF THE DRAWINGS

In the following, preferred embodiments of the present invention will be elucidated in more detail by way of the accompanying drawings in which.

DESCRIPTION OF THE PREFERRED EMBODIMENTS

In the following, an embodiment of a coder will be described in more detail with reference to FIG. 1. It is to be understood that the circuit shown in FIG. 1 constitutes merely a preferred embodiment, without the present invention being restricted thereto.

Figure 1:
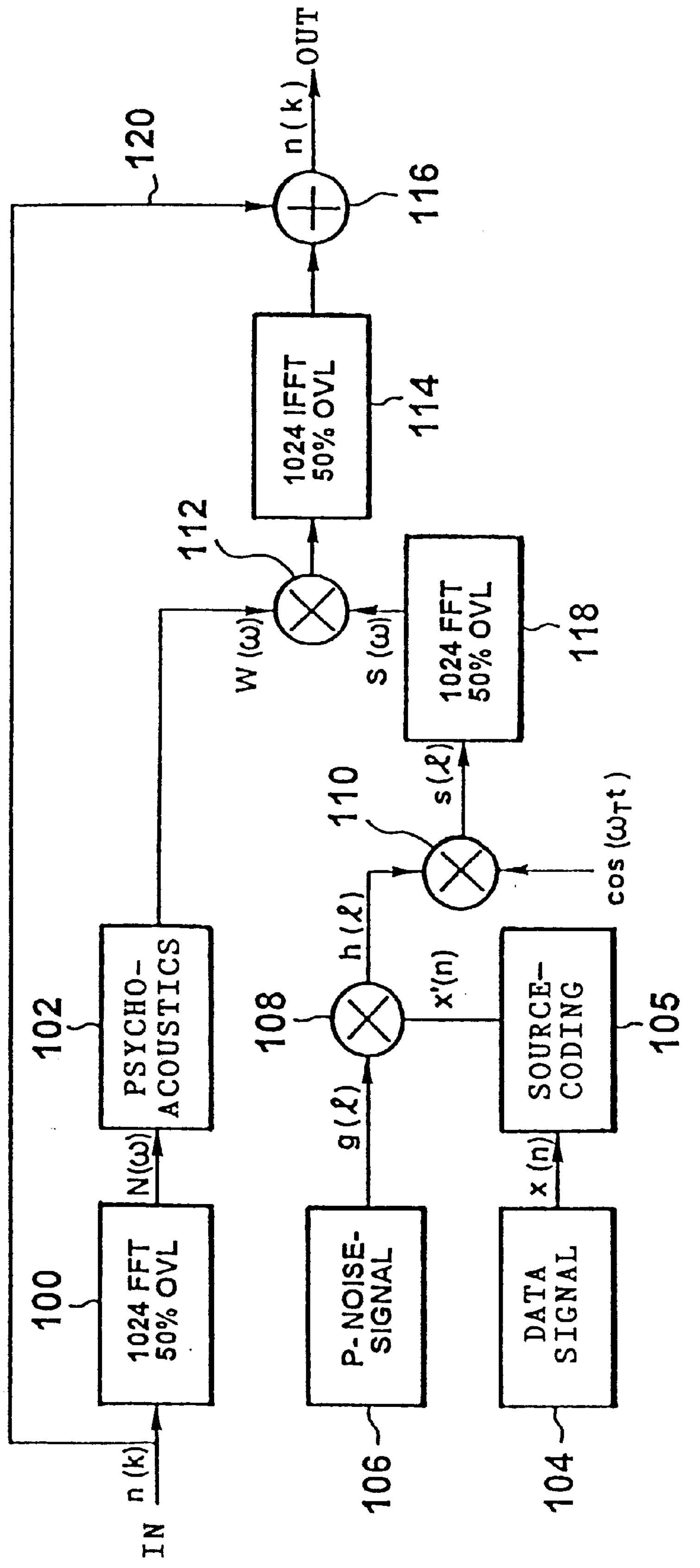
FIG. 1 shows an embodiment of a coder according to the invention.

The coding circuit depicted in FIG. 1 consists of a transformation block 100, a psychoacoustics block 102, a data signal generator 104, a source coding block 105, a pseudo-noise signal generator 106, a BPSK baseband modulator 108 (BPSK=Binary Phase Shift Keying), a BPSK modulator 110, a means for weighting two signals 112, a retransformation block 114, and a superposition means 116. In the embodiment shown in FIG. 1, the BPSK baseband modulator 108, the BPSK modulator 110 and the means for weighting two signals 112 are each constituted by a multiplier. Moreover, an additional transformation block 118 is provided, transforming the output signal s(l) of BPSK modulator 110 to the spectral range.

Transformation block 100 is connected to an input IN of the circuit. The output of transformation block 100 is connected to psychoacoustics block 102. The input of the circuit is connected furthermore to an input of superposition means 116.

The output of pseudo-noise signal generator 106 is connected to an input of BPSK baseband modulator 108, and the output of data signal generator 104 is connected to the input of source coding block 105 whose output in turn is connected to the other input of BPSK baseband modulator 108. The output of BPSK baseband modulator 108 is connected to an input of BPSK modulator 110 having its other input connected to a signal generator (not shown) applying a cosinusoidal signal to the other input of BPSK modulator 110. The output of BPSK modulator 110 is connected to the additional transformation block 118 having its output connected to weighting means 112.

The output of psychoacoustics block 102 is also connected to weighting means 112. The output of weighting means 112 is connected to an input of retransformation block 114. The output of retransformation block 114 is connected to a further input of superposition means 116, with the output of superposition means 116 being connected to an output OUT of the circuit.

In the following, a preferred embodiment of the coding method according to the invention will be described in more detail by way of FIG. 1.

At first, a music signal n(k) is fed at input "IN", which is present for example as digital PCM music signal (PCM=Pulse Coded Modulation). In transformation block 100, the music signal is first subjected to window transformation using a Hamming window and thereafter is transformed to the spectral range by fast Fourier transform (FFT=Fast Fourier transform) having a length of 1024 with 50% overlap. Thereafter, the spectrum N(ω) of music signal n(k) is present with 512 frequency lines, which is used as input signal for psychoacoustics 102. The spectrum of the music signal is applied at the same time to superposition means 116, as indicated by arrow 120.

In psychoacoustics block 102, the spectrum N(ω) is divided into critical bands. These bands have a width of ⅓ bark, which depending on the sampling frequency (in the present embodiment, this frequency is e.g. 44.1 kHz or 48 kHz) results in a band number of approx. 60 critical bands. The allocation of the frequencies f(Hz) to bands z(bark) is oriented along the lines of the band partitioning made by the human ear during hearing and is noted, for example, in standard ISO/IEC 11172-3 in table form. In these critical bands, the band energy is determined by summation of the real part and the imaginary part of the spectrum N(ω) according to the following equation:

$$E_i = Re(N(\omega_i))^2 + Im(N(\omega_i))^2$$

This energy distribution is then subjected to spreading. To this end, the so-called spread function is calculated, using the standard ISO/IEC 11172-3 (1993). Thereafter, the 60 spread courses or waveforms obtained are subjected to convolution with the band energies, thereby obtaining the excitation course or waveform. On the basis of the latter, it is possible to calculate the masking threshold W(z) for non-tonal audio signals in consideration of the masking extent, using one interpolation point for each critical band Z.

For tonal audio signals, the masking threshold W(z) is to be rated considerably lower. Thus, with the aid of signal prediction, a measure for the tonality is determined for each frequency line. The prediction determines from the two preceding FFTs for each line a predicted vector by addition of the difference in phase and amount from the vector of the last FFT line. Thereafter, an error vector is formed by establishing the difference between predicted vector and actual vector obtained from the FFT.

By establishing the amount of the error vector in the form of lines, a measure for the non-predictability of the signal (abbreviated cw=chaos measure) for each ω. From this "cw" value, which may take values between 0—"very tonal"—and 1—"non-tonal"—, the masking measure can be calculated that is to be taken into consideration in calculating the masking threshold.

As an alternative, the calculation of the masking threshold can also take place in different manner. The spectral lines obtained from FFT are combined in critical bands. These bands have a width of ⅓ bark, which depending on the sampling frequency (in the present embodiment, this frequency is e.g. 44.1 kHz or 48 kHz) results in a band number of approx. 60 critical bands. The allocation of the frequencies f(Hz) to bands z(bark) is oriented along the lines of the band partitioning made by the human ear during hearing and is noted, for example, in standard ISO/IEC 11172-3 in table form. In these critical bands, the band energy is determined by summation of the real part and the imaginary part of the spectrum N(ω) according to the following equation:

$$E_i = Re(N(\omega_i))^2 + Im(N(\omega_i))^2$$

It shall be assumed now that the entire band contains tonal signals only. In this case (worst case), the masking threshold results a fixed amount below the energy distribution of the music signal. As maximum masking extent e.g. −18 dB can be assumed. The advantage of this method consists in that the calculation is very simple, since neither convolutions nor predictions have to be carried out. The disadvantage resides in that energy reserves delivered by the music signal with respect to masking possibly are not utilized. However, when sufficient processing gain has been made available, this disadvantage is not disturbing.

W(z) then is converted to W(ω), this conversion making use of standard ISO/IEC 11172-3. Thus, the waveform of masking threshold W(ω) is applied to the output of block 102 and in dicates up to which energy level on the signal energy may be applied at a location ω such that this alteration remains non-audible.

Data signal generator 104 (DSG) makes available the useful data signal x(n) which as a rule is repeated cyclically for enabling decoding in a decoder at any time. The data signal has a bandwidth of 50 Hz for example. The data at the output of DSG 104 are in the form of a binary signal and have a low bit rate 1/Tx in the range of 1–100 bits/s. The spectrum of this signal must be of very narrow-band type in comparison with the spectrum of the signal issued by PN signal generator 106 with $\omega_x$.

Figure 2:
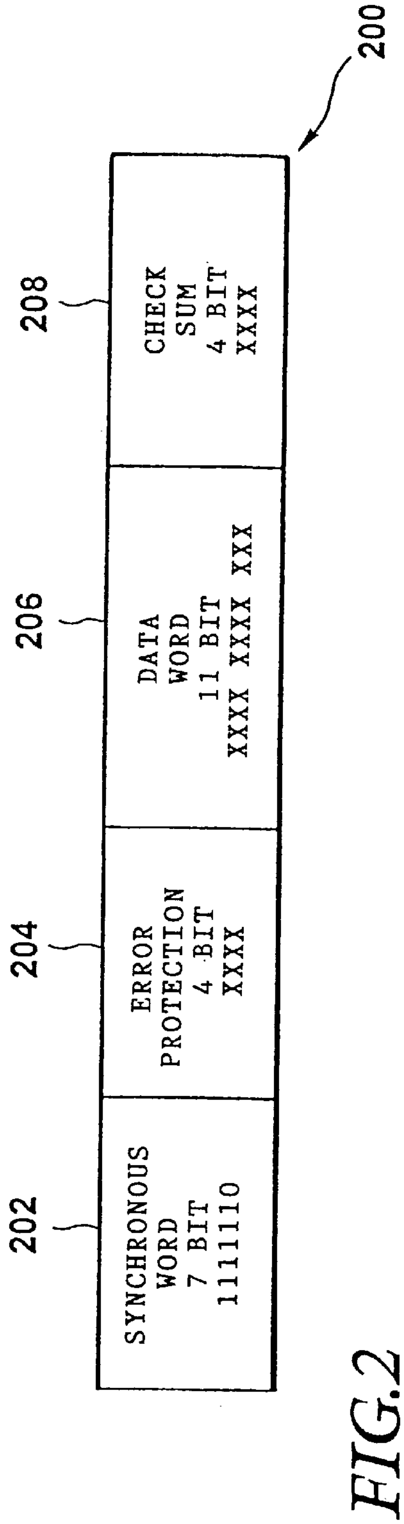
FIG. 2 is a representation of a transmission frame used for transmitting the useful signal.

The useful data signals x(n) in the embodiment shown in FIG. 1 consist of words having a length of 11 bits. These data words are included in a frame having a length of between 26 and 29 bits. FIG. 2 shows the structure of such a transmission frame in more detail. Transmission frame 200 includes four sections 202, 204, 206, 208. The first section is a synchronous word 202 consisting of seven bits (bits 0 to 6) and constituted by the bit sequence 1111110 in the embodiment shown in FIG. 2. The second section 202 serves for error protection and consists of four bits (bits 7 to 10). The third section 206 contains the data word having a length of 11 bits (bits 11 to 21). The fourth section 208 contains a check sum of four bits (bits 22 to 25).

The error protection (section 204 in FIG. 2) is realized by a non-systematic (15,11)-Hamming code. This block code is suitable for correcting all 1-bit errors. In case of multibit errors, the data word obtained is considered wrong and rejected. The advantage of this code is that it can be realized without great computer expenditure, by simple matrix multiplication, and thus is suitable also as regards the decoding method.

Due to the fact that the transmission channel operates in bit-oriented manner, the transmission frame has to be transmitted along with a HDLC protocol (HDLC=high-level data link control). This protocol is modified such that a "0" is not only inserted after six successive "1" bits, but also a "1" is inserted after six "0"-bits. This modification is necessary for recognizing and correcting phase deviations that may occur on the channel.

Figure 3:
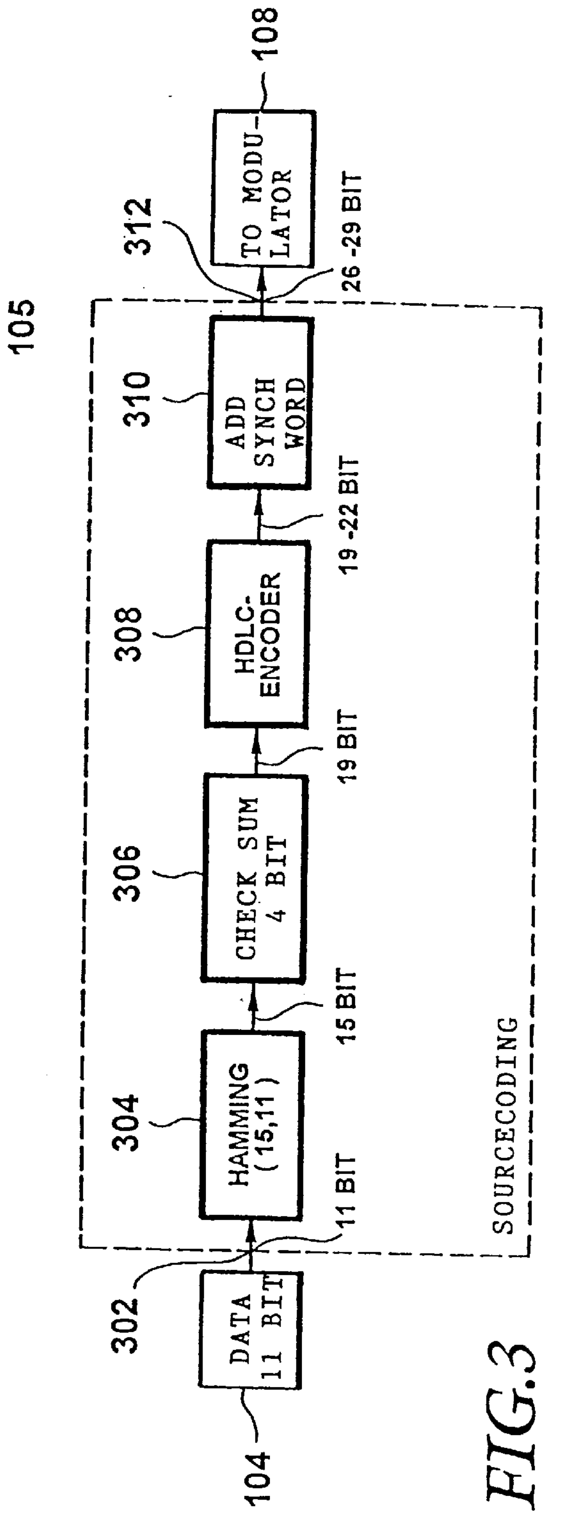
FIG. 3 is a block diagram of the source coding block shown in FIG. 1.

The transmission frame 200 is established by source coding block 105 (FIG. 1). FIG. 3 shows source coding block 105 in detail.

The data signals are made available to source coding block 105 from data signal generator 104. At the input 302 of block 105, the data are present in the form of data words having a length of 11 bits, as shown in FIG. 3. The transmission frame is composed such that error protection is realized first in a first block 304 by the (15,11)-Hamming code. The frame now has a length of 15 bits. Thereafter, the check sum is added to the frame in a second block 306. The length then is 19 bits. In block 318, the necessary coding of the transmission frame by a HDLC coder takes place, resulting in a frame length of 19 to 22 bits. The binary signal present at the output of block 308 then is transformed to an antipodal signal. This can be done e.g. with a relationship 0->1 and 1->−1. For completing the frame, the synchronous word is added thereto in block 310. At output 312 of source coding block 105, the transmission frame is present with a length of 26 to 29 bits, which is fed to BPSK baseband modulator 108.

Pseudo-noise signal generator 106 (PNSG) provides the spread signal g(l) having the bit rate 1/Tg. The bandwidth $\omega_g$ of this signal determines the bandwidth $\omega_s$ of the spread-spectrum signal and is in the range of 6 kHz in the embodiment shown in FIG. 1. The higher frequencies offered by a high-grade music signal were disregarded in consideration of the frequency response of the reproduction equipment (e.g. portable radio receivers). PNSG 106 according to an embodiment is composed as a fedback shift register and delivers a pseudo-random pseudo-noise sequence (PN sequence) having a length N. This sequence must be known in the decoder for decoding the signal.

The ratio Tx/Tn is referred to as spread factor and directly determines the signal to noise ratio up to which the method still operates in reliable manner. According to the embodiment described herein, the spread factor is 128 and the signal to noise ratio thus is SIN=10 log 10(Tx/Tn)=−21 dB.

The binary signal g(l) provided by PNSG 106 then is converted to an antipodal signal. This may take place e.g. with the relationship 0->1 and 1->−1. After such formatting, the signal has been processed and is fed to BPSK baseband modulator.

BPSK baseband modulator 108 is designed in simple manner when antipodal signals are used, since multiplication by sampling values corresponds to BPSK modulation. The resulting signal h(l)=g(l)x'(n) has a bandwidth of $\omega_h \approx 6$ kHz. The amplitude values are −1 and 1. The signal has its main maximum at 0 Hz and thus is present in the baseband.

The baseband signal h(l) now is supplied to BPSK modulator 110. In the latter, the baseband signal h(l) is modulated onto a cosinusoidal carrier $\cos(\omega_T t)$. The frequency of the carrier is half of the bandwidth of the spread band signal in the baseband. Thus, the first zero digit of the modulated spectrum comes to lie at 0 Hz. The signal can thus be transmitted on channels whose transmission function provides strong attenuation in the range from 0 to 100 Hz, as expected in audio transmissions via loudspeaker and microphone.

As an alternative, modulation can take place by suitable coding instead of a cosinusoidal carrier. Due to the specific property of being average-free, it is also possible to employ the Manchester code. Due to the average-free design thereof, no energy of the spread-band signal is applied at 0 Hz either, which is important for transmittability. The coding regulation for the Manchester code is 0->10 and 1->01. The number of the bits is thus doubled.

The time signal s(l) available at the output of BPSK modulator 110 then is transformed to the spectral range in transformation block 118 by means of a fast Fourier transform, so that S(ω) is present at the output of block 118.

The spectral course or waveform of the spread useful signal S(ω) now is weighted with the course or waveform of masking threshold W(ω) through weighting block 112, with the result that at no location in the audio spectrum is there more noise energy introduced by the spread-spectrum signal than is perceptible to the human ear. With respect to the demodulation of the useful signal, the statically changing course of the energy distribution in the useful signal is of little effect only, since the method is particularly powerful especially in this context.

Thereafter, retransformation takes place through inverse fast Fourier transform in block 114, so that the coded music signal is again present in the time domain. The 50% overlap is to be noted in the retransformation.

At block 116, the psychoacoustically weighted useful signal in the time domain is added to the music signal n(k).

The coder, at the output "OUT", delivers a digital PCM signal $n_c(k)$ that can be transmitted on an arbitrary transmission route as long as the same has a bandwidth of at least 6 kHz.

As an alternative to the embodiment described hereinbefore, the output of transformation block 100, instead of the input of the circuit, can be connected in addition to superposition means 116. In this case, the spectral spread signal and the spectral audio signal are superimposed, whereafter retransformation to the time domain takes place.

In the following, a preferred embodiment of a decoding circuit will be described which is used for performing a preferred embodiment of the method of decoding a data signal contained in an audio signal in non-audible manner according to the invention.

The decoder comprises a microphone 400 receiving, for example, a music signal transmitted from a radio receiver. The output of microphone 400 is connected to the input of a lowpass 402 having its output connected to an amplifier 404 with automatic gain control. The output of amplifier 404 is connected to an analog/digital converter 406. The output of analog/digital converter 406 is connected to the input of a non-recursive filter 408 (matched FIR-filter) having its output connected to an input of a bit synchronization control block 410. The output of block 410 is connected to the input of a data decoder 412. The decoded data signal is available at the output of data decoder 412.

Figure 4:
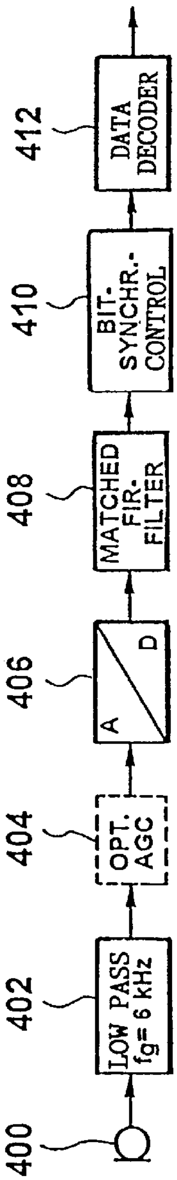
FIG. 4 shows an embodiment of a decoder according to the invention.

In the following, an embodiment of the decoder according to the invention will be described by way of FIG. 4. The music signal $n_c(k)$ broadcast by the radio receiver is converted by microphone 400 into electrical signals and fed to lowpass 402. The limit frequency of lowpass 402 is such that the frequency portions having no data modulated therein are strongly attenuated. In the present embodiment the limit frequency is 6 kHz. Lowpass filtering has the function of avoiding overlap distortions which may occur by the subsequent sampling of the signal.

Amplifier 404 with automatic gain control (AGC= Automatic Gain Control) ensures a constant instantaneous power of the input signal upstream of A/D converter 406. This is necessary for being able to compensate for temporary attenuations due to a particular channel. It is pointed out that the decoder can be realized both in terms of hardware and in terms of software. In case of a software realization, amplifier 404 can be dispensed with.

The A/D converter carries out sampling and digitization of the signal.

Matched filter 408 consists of a FIR-filter or non-recursive filter. Filter 408 contains as coefficient the inverse sequence of the PN sequence of the transmitter. The PN sequence of the pseudo-noise signal can be Manchester-coded, for example. In that case, filter 408 contains as coefficient the inverse Manchester-coded sequence of the PN sequence of the transmitter. With maximum correlation, filter 408 thus produces a peak at the output with a sign corresponding to that of the transmitted symbol. The filter output, at a distance of the length 2*N of the PN sequence, thus delivers peaks representing the data transmitted. Due to the fact that the peaks cannot be determined unequivocally at all times, filter 408 has the bit synchronization control block 410 connected downstream thereof.

The synchronization control in block 410 searches the output signal of filter 408 for peaks which unequivocally stand out from the noise background. Once such a peak has been found, keying is performed into the output of filter 408 synchronously with the length of the PN sequence, in order to retrieve the symbols transmitted. If an unambiguous peak appears during this time, the sampling time is corrected in corresponding manner.

The output of block 410 delivers a bit stream that is processed in the subsequent data decoder 412. This bit stream, in the event that no validly coded signal is present at the input of microphone 402, constitutes a random sequence of bits. When the decoder is bit-synchronized, the bit stream contains the data transmitted.

Figure 5:
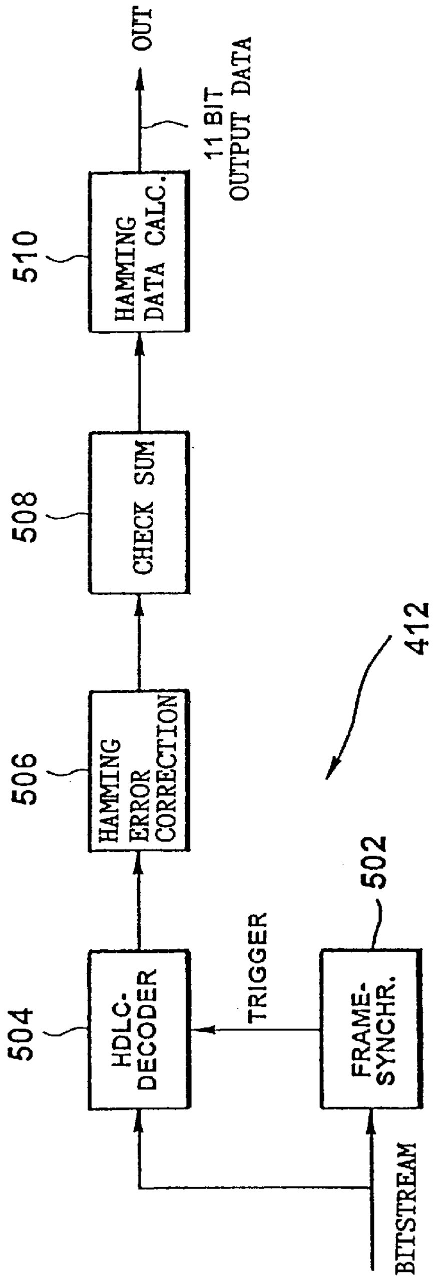
FIG. 5 is a block diagram of the data decoder shown in FIG. 4.

In data decoder 412, decoding of the useful signal from the bit stream from block 410 takes place. The data decoder will now be described in more detail with reference to FIG. 5. Data decoder 412 comprises an input IN connected to a frame synchronization block 502 and a HDLC decoder block 504. Block 502 outputs a trigger signal to block 504. The output of block 504 is connected to the input of a Hamming error correction block 506 having its output connected to the input of a check sum block 508. Subsequent to block 508, Hamming data calculation takes place in block 410. The output of block 410 is connected to the output OUT of data decoder 412 having the data word with a length of 11 bits present at its output.

Frame synchronization block 502 receives the input bit stream and searches therein the synchronization word 202. When the latter is found, HDLC decoder 504 is triggered and the input data are decoded in corresponding manner. Thereafter, syndrome calculation and error correction take place using the Hamming code. By way of the bit-error-corrected 15-bit word, the check sum is calculated and compared to the bits transmitted. When all of these operations are successful, the 15 bits are decoded using the Hamming code, and the 11 data bits transmitted are output from the decoder.

It is pointed out that the coding and decoding methods described hereinbefore constitute merely preferred embodiments of the present invention without intention to restrict the invention thereto.

The essential features of the coding method according to the invention for introducing a non-audible data signal into an audio signal are transforming the audio signal to the spectral range, determining the masking threshold of the audio signal, providing a pseudo-noise signal, providing the data signal, multiplying the pseudo-noise signal by the data signal so as to provide a frequency-spread data signal, weighting of the spread data signal with the masking threshold, and superimposing the audio signal and the weighted signal.

The essential features of the method of decoding a data signal contained in an audio signal in non-audible manner, according to the invention, are sampling the audio signal, non-recursive filtering of the sampled audio signal and comparing the filtered audio signal to a threshold value so as to retrieve the data signal.

In the following, a system according to the present invention for determining the listener distribution of individual radio stations by way of an identification signal will be described with reference to FIG. 6. The system described by way of FIG. 6 uses the afore-described coding method for introducing the identification signal to the audio signal transmitted and uses the above-described decoding method for decoding the signal from the audio signal received.

Figure 6:
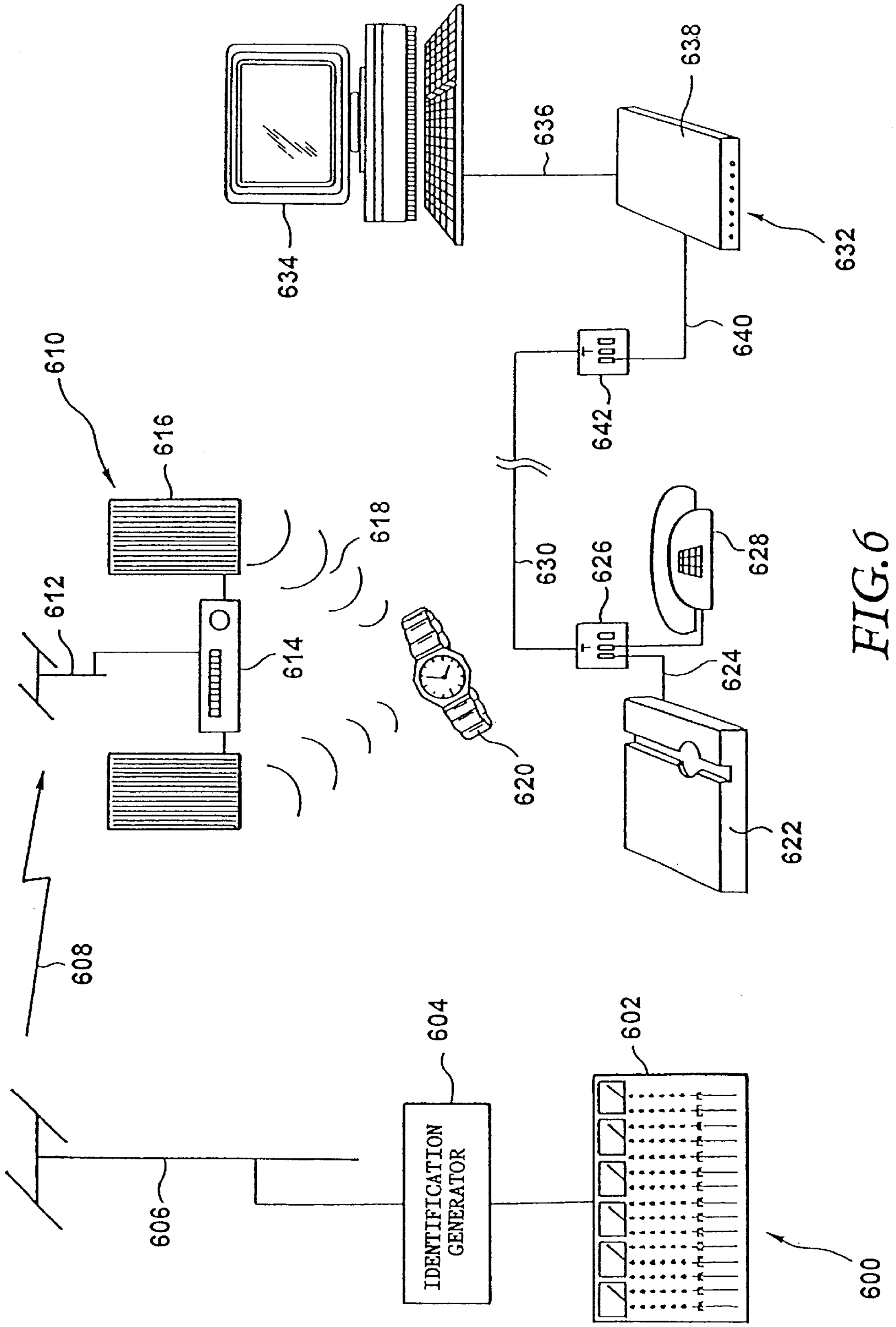
FIG. 6 shows an embodiment of a system for determining the listener distribution of a radio station, making use of the coding and decoding methods according to the invention.

The system described by way of FIG. 6 renders possible to ascertain the listener distribution of the individual radio stations in reliable manner. The system is independent of the receiving apparatus employed, so that the different listening habits can be taken into account.

The broadcasting transmission also can take place via different media:

FM (analog)

cable (analog and digital)

DAB (220 MHz terrestrial; 1.5 GHz terrestrial and satellite-based)

ADR

Analog satellites subcarriers (television satellites)

LW/MW/SW television sound.

It is specific to each country which media are relevant for evaluation, but the system shown in FIG. 6 is capable of supporting the media listed above. The detection of the listener reach takes place in predetermined time intervals which are adjustable depending on each particular case. According to an example, the time interval may be 10 seconds. Furthermore, a definition has to be made as to how current the evaluation has to be. According to the example of a system shown in FIG. 6, the listener data are detected during the night. In other embodiments, it may be sufficient to send in the detection apparatus in intervals of 4 weeks each for data evaluation.

The system as shown in FIG. 6 in more detail comprises a detection apparatus reaching a high degree of acceptance on the side of the listeners, so as to ensure the reliability of the data collection. For providing an as comprehensive as possible data acquisition, the detection apparatus is carried on the body of a test listener or test person, and this detection apparatus is a small apparatus with sufficient battery supply, for example by storage cells, which has a pleasing design and is easy to handle. The storage cells are reloaded in a charging or docking station.

The system according to the invention in FIG. 6 in its entirety bears reference numeral 600. System 600 consists of the following components. An audio signal is generated in a radio station 602 and by means of an identification generator 604 has an identification signal applied thereto. The application of the audio signal by identification generator 604 takes place using the afore-described coding method for introducing a non-audible data signal into an audio signal. The audio signal having the identification signal applied thereto is passed further to an antenna 606 effecting broadcasting 608 of the audio signal. A broadcast receiver 610 consisting of an antenna 612, a receiver apparatus 614 and two loudspeakers 616 receives the broadcast audio signal. The audio signal received by antenna 612 is converted via receiver 614 and loudspeakers 616 into an audible audio signal 618 which is received by a detection apparatus. In the embodiment shown in FIG. 6, receiving apparatus 620 is in the form of a wrist watch. Detection apparatus 620 is effective for extracting the identification signal from the audio signal 618 received. This takes place with the aid of the method according to the invention for decoding a data signal contained in an audio in non-audible manner. The identification signal ascertained by receiving apparatus 620 is latched in the receiving apparatus. There is provided a so-called docking station for accommodating wrist watch 620 for example during the night, so as to effect transmission of the identification data stored. Docking station 622 can be connected to a communication network 630, which in an embodiment is the telephone network, via a line 624 and a corresponding connecting means 626 which may have a telephone 628 connected thereto in addition. Via the communication network 630, the data stored in receiving apparatus 620, i.e. the identification data, are sent to a central station 623 which comprises a computer 634 for evaluating the data received. Computer 634 is connected via a line 636 to a modem 638 which in turn is connected to communication network 630 via a line 640 and an additional connecting means 642.

The system depicted in FIG. 6 is capable of reliably ascertaining the listener data of selected radio stations for the current day, with the resolution of the system in terms of time being in the range of a few seconds. Due to the technology with little complexity, the same can be realized in inexpensive manner.

In the following, a system according to the present invention for determining the transmitter reach of a radio station by way of an identification signal will be described in more detail with reference to FIG. 7. The system described by way of FIG. 7 uses the afore-described coding method for introducing the identification signal to the audio signal transmitted and uses the above-described decoding method for decoding the signal from the audio signal received.

Figure 7:
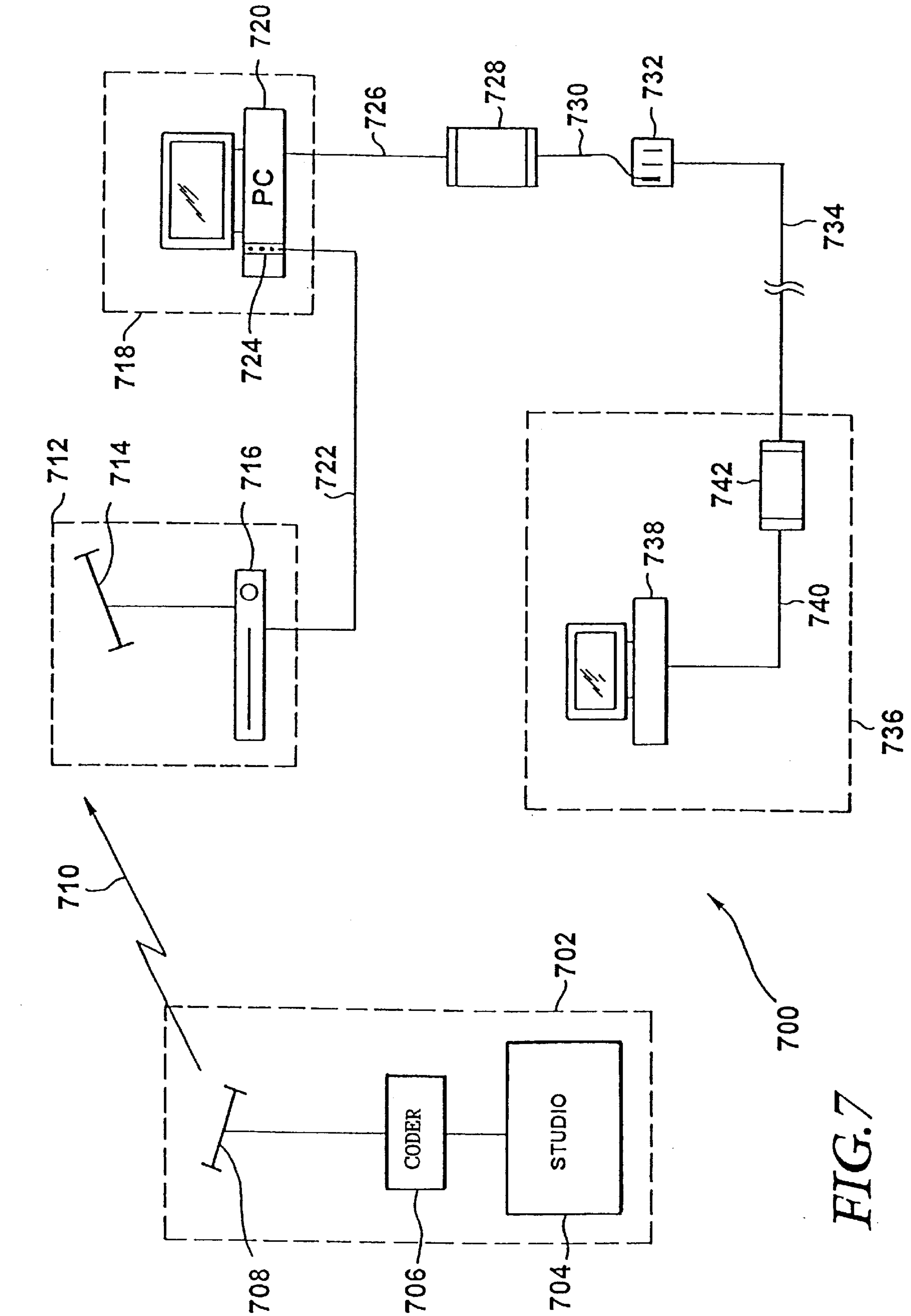
FIG. 7 shows an embodiment of a system for determining the listener distribution of a radio station, making use of the coding and decoding methods according to the invention.

The system according to the invention in FIG. 7 in its entirety bears reference numeral 700. In system 700, an audio signal is generated in a radio station 702, for example in a studio 704, and by means of an identification generator or coder 706 has an identification signal applied thereto. The application of the audio signal by identification generator 706 takes place using the afore-described coding method for introducing a non-audible data signal into an audio signal. The audio signal having the identification signal applied thereto is passed further to an antenna 708 effecting broadcasting 710 of the audio signal. A broadcast receiver 712, for example a test receiver, consisting of an antenna 714 and a receiver apparatus 716 receives the broadcast audio signal. The receiver 716 shown in FIG. 7 serves only for receiving the audio signal. As this embodiment is concerned only with the determination of the transmitter reach, a reproduction of the audio signal transmitted can be dispensed with.

An advantage of this procedural mode consists in that, for determining the transmitter reach, not only a limited band range in the audio signal can be used for transmitting the audio signal. Rather, it is possible to utilize the entire bandwidth of the audio signal transmitted. This permits an increase either of the decoding safety or of the amount of data transmitted.

In the embodiment shown in FIG. 7, decoder 718 performing the decoding method is constituted by a computer 720 realizing the method by way of software technology. As can be seen in FIG. 7, receiver 716 is effectively connected via a line or cable 722 to a so-called sound card 724 in the computer for rendering possible processing of the audio signal by the computer. The transmission from receiver 712 to decoder 718 via line 722 takes place in analog manner. In other words, the audio signal received is fed directly from receiver 712 to decoder 718.

Decoder 718 is connected via a line 724 to a modem 728 which in turn is connected to a corresponding connecting means 732 via an additional line 730. Connecting means 732 is connected to a communication network 734, for example a telephone network. Via communication network 734, the data ascertained from the data signal, i.e. the identification data, are sent to a central station 736 comprising a computer 738 for evaluating the data received. Computer 738 is connected via a line 740 to a modem 742 which in turn is connected to communication network 734.

In the following, a system for identifying audio signals will be described with reference to FIG. 8, which serves to identify sound carriers and copies of sound carriers by way of the identification signal introduced into the audio signal. The advantage resides in that it is rendered possible thereby to easily identify possible pirated copies, since each individual sound carrier is provided with an individual identification in the factory.

FIG. 8*a* depicts the production of a sound carrier, such as for example a compact disk "CD", in a press assembly 800. Press assembly 800 comprises a reproducing means 802 running a master tape containing the audio signals to be applied to a CD. The CD is pressed in a press mechanism 804. Between press mechanism 804 and reproducing means 802, there is disposed a coder 806. By means of the coder, each CD has an identification signal associated therewith which is introduced into the audio signal. Coding takes place in accordance with the above-described coding method. For ensuring the generation of individual identification signals for individual CDs, coder 806 has a counter associated therewith which, for example, makes available consecutive identification numbers as identification signal for introduction into the audio signal.

On the basis of FIG. 8*b*, the effect of the identifications on individual CDs shall be elucidated in more detail. A CD 808 provided with an individual identification is copied several times, as indicated by the schematically shown reproducing apparatus 810. The copies can be made both in analog and in digital manner.

Figure 8:
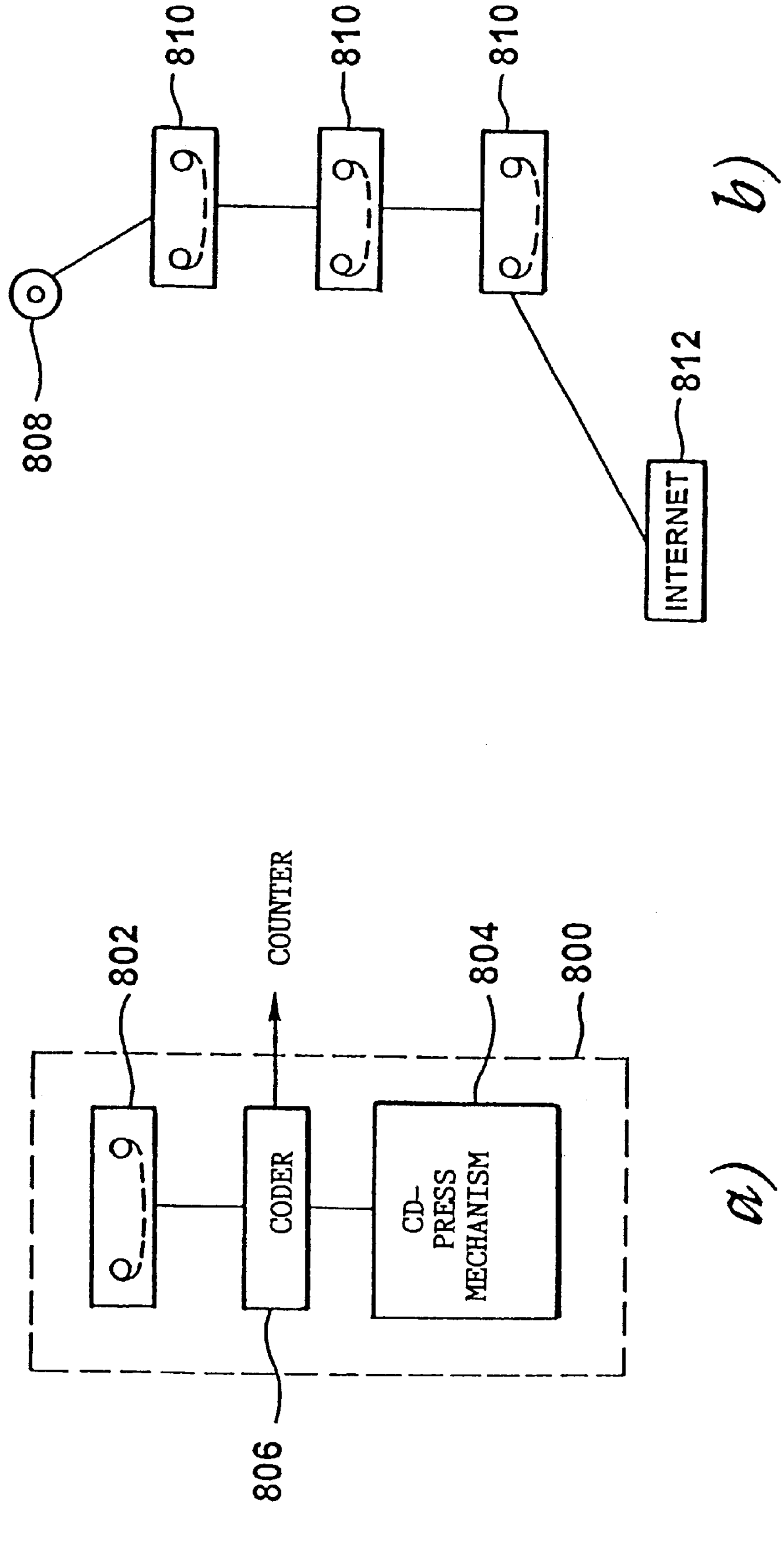
FIG. 8 shows an embodiment of a system for identifying audio signals with an unequivocal identification number for identifying sound carriers.

After the identification has been introduced into the audio signal, this identification is maintained also in case of transmission of the audio signal in the form of a soundfile via the internet, as indicated by numeral 812 in FIG. 8. This permits conclusions to be made to the soundfile on the sound carrier.

Figure 9:
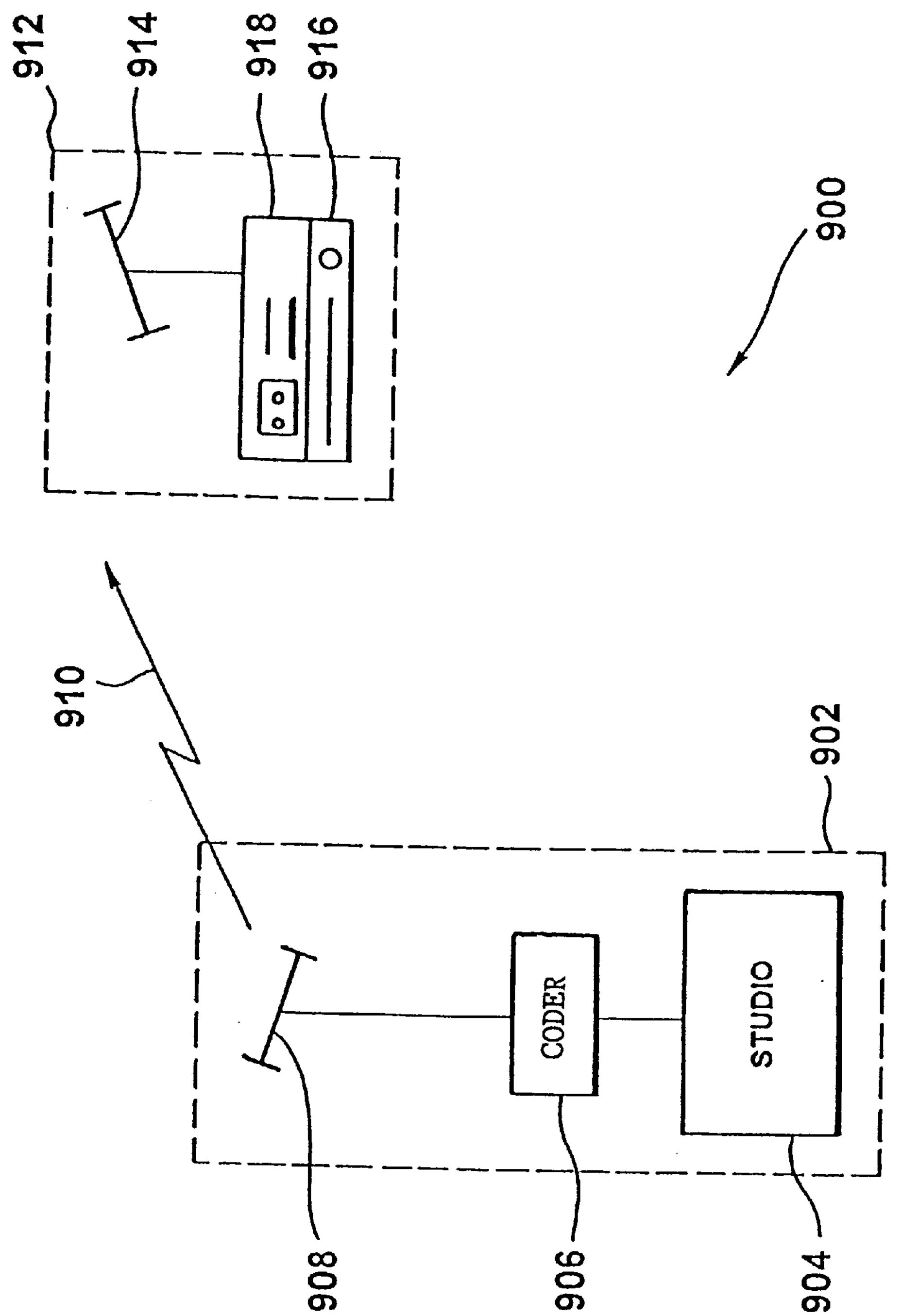
FIG. 9 shows an embodiment of a system for remote control of audio equipment, making use of the coding and decoding methods according to the invention.

In the following, a further embodiment will be described with reference to FIG. 9. FIG. 9 shows a system for remote control of audio apparatus, which makes use of the coding and decoding methods according to the invention.

The system according to the invention in FIG. 9 in its entirety bears reference numeral 900. In this system 900 an audio signal is generated in a radio station 902, for example in a studio 904. By means of a coder 706, a data signal or control signal is introduced into the audio signal. The application of the audio signal by way of coder 906 takes place using the afore-described coding method for introducing a non-audible data signal into an audio signal. The audio signal having the signal applied thereto is passed on to an antenna 908 effecting broadcasting 910 of the audio signal. A receiver 912, consisting of an antenna 914 and a receiver apparatus 916, receives the emitted audio signal. Receiver 916 has a decoder provided therein which extracts the data signal contained in the audio signal in accordance with the decoding method described hereinbefore. The receiver is constructed such that it is responsive to the data signal, for example, for beginning recording of a music program of a radio station. Due to the data signal extracted from the audio signal, the receiver effects activation of a recording apparatus 918 for recording the audio signal transmitted. In this manner, a system is provided for radios which makes available a method comparable to the "VPS" system for television.

According to an additional embodiment of the present invention, a system is provided making available a data channel operating parallel to the audio signal, in audio apparatus processing digital data. This data channel has a low bit rate, and information is introduced into the same in accordance with the method described hereinbefore and extracted from the same in accordance with the decoding method described hereinbefore.

It is pointed out that the coder and decoder described herein before constitute just preferred embodiments. The essential features of the coder for introducing a non-audible data signal into an audio signal are transforming the audio signal to the spectral range, determining the masking threshold of the audio signal, providing a pseudo-noise signal, providing the data signal, multiplying the pseudo-noise signal by the data signal so as to provide a frequency-spread data signal, weighting the spread data signal with the masking threshold, and superimposing the audio signal and the weighted signal.

The essential features of the decoder for extracting a data signal contained in an audio signal in non-audible manner, are sampling the audio signal, non-recursive filtering of the sampled audio signal and comparing the filtered audio signal to a threshold value so as to retrieve the data signal.

What is claimed is:

1. A coding method for introducing a data signal into an audio signal to obtain a combined signal, in which the data signal is non-audible, said method comprising the following steps:

a) converting the audio signal to a spectral representation;

b) determining a masking threshold of the audio signal;

c) providing a pseudo-noise signal;

d) providing the data signal;

e) multiplying the pseudo-noise signal by the data signal so as to provide a frequency-spread data signal;

f) weighting the frequency-spread data signal with the masking threshold to obtain a weighted data signal; and g) superimposing the audio signal and the weighted data signal to obtain the combined audio signal.

2. The coding method of claim 1, wherein step a) includes applying a fast Fourier transform to the audio signal.

3. The coding method of claim 1, wherein step b) includes the following steps:

b1) splitting the spectral representation of the audio signal into critical bands;

b2) determining an energy in each critical band;

b3) calculating a spread function for each critical band;

b4) performing a convolution of spread waveforms of all critical bands with the energies in the critical bands for obtaining a waveform of an excitation;

b5) determining a non-predictability of the audio signal;

b6) performing a convolution of the non-predictability with the spread function to obtain a measure for a tonality;

b7) calculating a masking measure on the basis of the tonality; and b8) calculating the masking threshold on the basis of the excitation in consideration of the masking measure.

4. The coding method of claim 1, wherein step b) comprises the following steps:

b1) splitting the spectral representation of the audio signal into critical bands;

b2) determining an energy in each critical band; and b3) determining the masking threshold on the basis of energies in the critical bands in consideration of a masking measure for tonal masking.

5. The coding method of claim 1, wherein the pseudo-noise signal has a bandwidth of 6 kHz.

6. The coding method of claim 1, wherein the data signal has a bandwidth of 50 Hz.

7. The coding method of claim 1, wherein the data signal is channel-coded by a block code.

8. The coding method of claim 1, wherein, prior to step e), the pseudo-noise signal and the data signal are converted to antipodal signals.

9. The coding method of claim 1, wherein step e) comprises the following steps:

e1) performing a BPSK baseband modulation of the data signal with the pseudo-noise signal to obtain a first modulated signal;

e2) performing a BPSK modulation of the first modulated signal with a carrier signal having a frequency in a range of an audible audio spectrum to obtain a second modulated signal; and e3) transforming the second modulated signal into a spectral domain.

10. The coding method of claim 9, wherein the carrier signal is cosinusoidal and has a frequency of 3 kHz.

11. The coding method of claim 9, wherein step e1) includes a step of Manchester coding of the pseudo-noise signal.

12. The coding method of claim 1, wherein prior to step g) the weighted data signal of step f) is transformed to a time domain.

13. The coding method of claim 1, wherein step g) includes superimposing the audio signal in the spectral domain on the weighted data signal of step f) to obtain a superimposed signal and retransforming the superimposed signal to the time domain thereafter.

14. The coding method of claim 13, wherein the retransforming to the time domain takes place by a fast Fourier transform.

15. A method of decoding a combined audio signal for obtaining a data signal, the combined audio signal including an audio signal and the data signal, the data signal being multiplied by a pseudo-noise signal and weighted with a masking threshold of the audio signal such that the data signal is contained in a non-audible manner in the combined audio signal, said method comprising the following steps:

a) providing a sampled combined audio signal;

b) non-recursive filtering of the sampled combined audio signal using a matched filter, the matched filter being matched to the pseudo-noise signal, whereby a filtered combined audio signal is obtained which includes correlation peaks indicating a correlation between the sampled combined audio signal and the pseudo-noise signal; and c) comparing the filtered combined audio signal to a threshold value to detect the peaks, wherein the peaks represent the data signal.

16. The method of claim 9, wherein the audio signal is received by means of a microphone.

17. The method of claim 15, wherein prior to step a) the audio signal is lowpass-filtered and amplified.

18. A coder for introducing a data signal into an audio signal to obtain a combined signal, in which the data signal is non-audible, comprising:

a converter for converting the audio signal to a spectral representation;

a calculator for determining a masking threshold of the audio signal;

a multiplier for multiplying a pseudo-noise signal by the data signal so as to provide a frequency-spread data signal;

a weighter for weighting the frequency-spread data signal with the masking threshold to obtain a weighted data signal; and a superimposer for superimposing the audio signal and the weighted data signal to obtain the combined audio signal.

19. A decoder for decoding a combined audio signal for extracting a data signal, the combined audio signal including an audio signal and the data signal, the data signal being multiplied by a pseudo-noise signal and weighted with a masking threshold of the audio signal such that the data signal is contained in an audio signal in non-audible manner, comprising:

a provider for providing a sampled combined audio signal;

a matched filter for filtering the sampled audio signal in non-recursive manner, the matched filter being matched to the pseudo-noise signal, whereby a filtered combined audio signal is obtained which includes correlation peaks indicating a correlation between the sampled combined audio signal and the pseudo-noise signal; and a comparator for comparing the filtered audio signal to a threshold value to detect the peaks, wherein the peaks represent the data signal.

20. The decoder of claim 19, further comprising a bit synchronization control block for searching the filtered combined audio signal for a peak having a certain distance from a noise background and for searching for other peaks at distances from the peak, the distances corresponding to a length of the pseudo-noise signal.

21. The decoder of claim 19, in which the data signal is organized in frames of several bits, the decoder further comprising a frame synchronization block for providing a trigger signal at a beginning of a frame of the data signal.

22. The decoder of claim 21, in which the frame of the data signal is channel encoded, the decoder further comprising a channel decoder for channel decoding the frame of the data signal to obtain a data word.

23. A system for determining the listener distribution of individual radio stations by way of an identification signal, the identification signal constituting a data signal, comprising:

a coder for introducing the data signal into an audio signal to obtain a combined signal, in which the data signal is non-audible, comprising:

a converter for converting the audio signal to a spectral representation;

a calculator for determining a masking threshold of the audio signal;

a multiplier for multiplying a pseudo-noise signal by the data signal so as to provide a frequency-spread data signal;

a weighter for weighting the frequency-spread data signal with the masking threshold to obtain a weighted data signal; and a superimposer for superimposing the audio signal and the weighted data signal to obtain the combined audio signal;

a decoder for decoding the combined audio signal for extracting the data signal, the combined audio signal including said audio signal and the data signal, the data signal being multiplied by said pseudo-noise signal and weighted with said masking threshold of the audio signal such that the data signal is contained in said audio signal in non-audible manner, comprising:

a provider for providing a sampled combined audio signal;

a matched filter for filtering the sampled audio signal in non-recursive manner, the matched filter being matched to the pseudo-noise signal, whereby a filtered combined audio signal is obtained which includes correlation peaks indicating a correlation between the sampled combined audio signal and the pseudo-noise signal; and a comparator for comparing the filtered audio signal to a threshold value to detect the peaks, wherein the peaks represent a received identification signal; and a central station for evaluating the received identification signal.

24. A system for determining the transmitter reach of a radio station by way of an identification signal, the identification signal constituting a data signal, comprising:

a coder for introducing the data signal into an audio signal to obtain a combined signal, in which the data signal is non-audible, comprising:

a converter for converting the audio signal to a spectral representation;

a calculator for determining a masking threshold of the audio signal;

a multiplier for multiplying a pseudo-noise signal by the data signal so as to provide a frequency-spread data signal;

a weighter for weighting the frequency-spread data signal with the masking threshold to obtain a weighted data signal; and a superimposer for superimposing the audio signal and the weighted data signal to obtain the combined audio signal a decoder for decoding the combined audio signal for extracting the data signal, the combined audio signal including said audio signal and the data signal, the data signal being multiplied by a pseudo-noise signal and weighted with a masking threshold of the audio signal such that the data signal is contained in said audio signal in non-audible manner, comprising:

a provider for providing a sampled combined audio signal;

a matched filter for filtering the sampled audio signal in non-recursive manner, the matched filter being matched to the pseudo-noise signal, whereby a filtered combined audio signal is obtained which includes correlation peaks indicating a correlation between the sampled combined audio signal and the pseudo-noise signal; and a comparator for comparing the filtered audio signal to a threshold value to detect the peaks, wherein the peaks represent a received identification signal; and a central station for evaluating the received identification signal.

25. A system for identifying audio signals with an unequivocal identification number for identifying the sources of copies of sound carriers or sound files, the unequivocal identification number constituting a data signal, comprising:

a coder for introducing the data signal into an audio signal to obtain a combined signal, in which the data signal is non-audible, comprising:

a converter for converting the audio signal to a spectral representation;

a calculator for determining a masking threshold of the audio signal;

a multiplier for multiplying a pseudo-noise signal by the data signal so as to provide a frequency-spread data signal;

a weighter for weighting the frequency-spread data signal with the masking threshold to obtain a weighted data signal; and a superimposer for superimposing the audio signal and the weighted data signal to obtain the combined audio signal;

a decoder for decoding the combined audio signal for extracting the data signal, the combined audio signal including said audio signal and the data signal, the data signal being multiplied by said pseudo-noise signal and weighted with a masking threshold of the audio signal such that the data signal is contained in said audio signal in non-audible manner, comprising:

a provider for providing a sampled combined audio signal;

a matched filter for filtering the sampled audio signal in non-recursive manner, the matched filter being matched to the pseudo-noise signal, whereby a filtered combined audio signal is obtained which includes correlation peaks indicating a correlation between the sampled combined audio signal and the pseudo-noise signal; and a comparator for comparing the filtered audio signal to a threshold value to detect the peaks, wherein the peaks represent a received unequivocal identification number; and a central station for evaluating the received unequivocal identification number.

26. A system for the remote control of an audio apparatus by way of a control signal, the control signal constituting a data signal, comprising:

a coder for introducing the data signal into an audio signal to obtain a combined signal, in which the data signal is non-audible, comprising:

a converter for converting the audio signal to a spectral representation;

a calculator for determining a masking threshold of the audio signal;

a multiplier for multiplying a pseudo-noise signal by the data signal so as to provide a frequency-spread data signal;

a weighter for weighting the frequency-spread data signal with the masking threshold to obtain a weighted data signal; and a superimposer for superimposing the audio signal and the weighted data signal to obtain the combined audio signal;

a decoder for decoding the combined audio signal for extracting the data signal, the combined audio signal including said audio signal and the data signal, the data signal being multiplied by said pseudo-noise signal and weighted with said masking threshold of the audio signal such that the data signal is contained in said audio signal in non-audible manner, comprising:

a provider for providing a sampled combined audio signal;

a matched filter for filtering the sampled audio signal in non-recursive manner, the matched filter being matched to the pseudo-noise signal, whereby a filtered combined audio signal is obtained which includes correlation peaks indicating a correlation between the sampled combined audio signal and the pseudo-noise signal; and a comparator for comparing the filtered audio signal to a threshold value to detect the peaks, wherein the peaks represent the control signal, wherein the audio apparatus is responsive to the control signal.

27. The system according to claim 26, in which recording of an audio signal in the audio apparatus is started and/or terminated in response to the control signal.

28. A system for providing a data channel of low bit rate in an audio signal, said channel to be used for transmitting useful data in parallel to the audio signal, the useful data constituting the data signal, comprising:

a coder for introducing the data signal into an audio signal to obtain a combined signal, in which the data signal is non-audible, comprising:

a converter for converting the audio signal to a spectral representation;

a calculator for determining a masking threshold of the audio signal;

a multiplier for multiplying a pseudo-noise signal by the data signal so as to provide a frequency-spread data signal;

a weighter for weighting the frequency-spread data signal with the masking threshold to obtain a weighted data signal; and a superimposer for superimposing the audio signal and the weighted data signal to obtain the combined audio signal;

a decoder for decoding the combined audio signal for extracting the data signal, the combined audio signal including said audio signal and the data signal, the data signal being multiplied by said pseudo-noise signal and weighted with said masking threshold of the audio signal such that the data signal is contained in said audio signal in non-audible manner, comprising:

a provider for providing a sampled combined audio signal;

a matched filter for filtering the sampled audio signal in non-recursive manner, the matched filter being matched to the pseudo-noise signal, whereby a filtered combined audio signal is obtained which includes correlation peaks indicating a correlation between the sampled combined audio signal and the pseudo-noise signal; and a comparator for comparing the filtered audio signal to a threshold value to detect the peaks, wherein the peaks represent the useful data.

* * * * *